United States Patent [19]

Katz

[11] Patent Number: 4,704,172
[45] Date of Patent: Nov. 3, 1987

[54] METHOD OF PRODUCING COMPOSITE NON-DISTORTABLE NEEDLEWORK CANVAS MATERIALS

[76] Inventor: Marcella M. Katz, 10573 Le Conte Ave., Los Angeles, Calif. 90024

[21] Appl. No.: 839,549

[22] Filed: Mar. 14, 1986

[51] Int. Cl.[4] .......................... A41H 1/00; A41H 3/06; B29C 65/08
[52] U.S. Cl. ............................ 156/73.2; 156/308.2; 156/324; 428/95; 428/236; 428/255
[58] Field of Search ................... 156/73.1, 73.2, 580.1, 156/580.2, 324, 148, 308.2; 428/233, 234, 235, 236, 247, 255, 95; 112/439, 266.1

[56] References Cited

U.S. PATENT DOCUMENTS

| | | | |
|---|---|---|---|
| 3,660,186 | 5/1972 | Sager et al. | 156/73.2 |
| 3,879,256 | 4/1975 | Rust, Jr. | 156/73.1 |
| 4,122,227 | 10/1978 | Dean | 428/255 |
| 4,154,181 | 5/1979 | Massucci et al. | 112/439 |
| 4,159,360 | 6/1979 | Kim | 428/235 |
| 4,188,445 | 2/1980 | Hill | 428/233 |
| 4,253,383 | 3/1981 | Noe | 428/255 |
| 4,328,270 | 5/1982 | Kostovski | 428/255 |
| 4,348,444 | 9/1982 | Craig | 428/255 |
| 4,623,573 | 11/1986 | Katz | 112/439 |

Primary Examiner—Michael Wityshyn
Attorney, Agent, or Firm—Philip D. Junkins

[57] ABSTRACT

A method of producing needlework canvas materials which are flexible, non-distortable composite laminated materials having a primary layer of non-elastic, open-mesh woven needlework fabric which has welded or bonded to one of its faces a relatively thin non-elastic secondary mesh-stabilizing layer of synthetic fiber sheer fabric material. The sheer fabric secondary layer is bonded to the open-mesh primary layer by the application of ultrasonic vibrations and pressure to interfaced moving webs of the primary and secondary fabric materials. The ultrasonic vibratory energy, applied to the interfaced webs, results in the creation of intermolecular mechanical stress with causes heating and melting of the thermoplastic or synthetic materials of the woven primary layer and the synthetic fiber material of the secondary layer. The thus melted thermoplastic material and synthetic fiber material co-mingle with bonding of the layers at a multiplicity of pressure points of contact of the threads of the primary layer with the fibers of the secondary layer, where intermolectular stress is maximized.

9 Claims, 3 Drawing Figures

METHOD OF PRODUCING COMPOSITE NON-DISTORTABLE NEEDLEWORK CANVAS MATERIALS

BACKGROUND OF THE INVENTION

1. Field of the Invention

The present invention relates to a method of producing composite non-distortable needlework materials having a uniform pattern of apertures forming a symmetrical gridwork intended to receive needle-directed yarn or thread for the purpose of creating a stitchery design thereon.

2. Description of the Prior Art

Embroidery is the art or process of forming decorative designs with hand needlework. When an open-mesh canvas or apertured sheet material having a uniform gridwork is used to receive the needlework, the art form is characterized as "needlepoint" or "canvas embroidery." In needlepoint the stitches are formed by passing needle-directed yarn or thread through openings in the canvas or apertured sheet material in simple even stitches across counted threads or between counted apertures.

Needlepoint canvas, in its simplest form, is comprised of evenly spaced, durable warp and woof threads woven into a textile in which the holes or apertures between the threads are commonly equal to or larger in size than the threads themselves. The canvas threads are usually composed of cotton or linen fibers, particularly where the gauge of the canvas (number of threads per inch) falls within the popular range of 10 to 18. Fine gauge needlepoint fabrics normally have 18 to 40 threads per inch and are woven from silk or synthetic fiber threads in addition to cotton and linen fiber threads. Textile and fabric materials, manufactured for use as needlepoint canvas, are usually sold by their manufacturers in "bolt" (roll) units having a minimum of 5–10 yards of material length.

The principal types of needlepoint canvases in use today are designated "mono-" meaning one thread on each side of each hole or aperture and "double" meaning two threads on each side of each major hole or aperture. There are two basic forms of mono- canvases, i.e., "mono-floating" and "mono-interlock." With mono-floating canvas the warp and weft (woof) threads are merely woven over and under each other whereas with mono-interlock canvas the warp threads (in fact) comprise two smaller (weaker) threads that are knotted or twisted at each over and under crossing of weft threads. Because of the weaving method, mono-floating canvases are subject to greater slippage between threads so that the mesh pattern of the canvas easily becomes distorted, i.e., the holes or apertures become of non-uniform size and configuration with repeated folding and needlepoint working of the canvas.

Double thread needlepoint canvas (also referred to as "Duo" or "Penelope") is woven with the warp and woof threads that form the principal holes or apertures of the canvas each comprised of a pair of slightly spaced threads which form small apertures. Other fine woven textiles used in the needlework arts include cloths woven so that the individual threads are thicker than the holes between them, "even weave" cloth and "Congress" cloth.

Mono-floating and mono-interlock needlepoint canvases have continued to be used for most stitchery applications despite their many shortcomings and the problems they create for the needlepoint artisan. The principal shortcomings and problems include edge raveling, canvas distortion, aperture irregularity and roughness, and thread shifting. Great care must be taken when cutting bolt or yardage canvas into smaller popular use size canvas pieces to make certain that each cutting course or line follows a single line of canvas holes or apertures, i.e., between warp and woof threads, so that edge raveling is minimized. Edge raveling becomes an even greater problem when the ultimate shape of the needlepoint piece is not rectangular with its edges not in parallel with warp and woof threads.

Canvas distortion, stretching, sagging, extension and creep constitute major problems to persons performing needlepoint stitchery. If one closely observes needlework canvas as needlepoint stitchery is applied, it becomes obvious that the vertical and horizontal forces applied to the canvas threads (defining each aperture in the canvas) by the yarn-guiding needle and the yarn itself (as they pass through such apertures) are unequal. Although canvas manufacturers have attempted to reduce the distortion problem through the weaving of monointerlock canvases and by the application of sizing (stiffening) agents to the canvas threads, the problem remains. Distortion correction, after completion of the needlework piece, by straightening or "blocking" the base canvas (and the needlework it bears) must overcome many built-in failure factors. Blocking, a somewhat costly procedure, involves the stretching and straightening of the needlework to its pre-stretched size and shape.

The foregoing problems with needlepoint canvas materials have been obviated through the improved needlepoint materials described in my co-pending U.S. patent applications: Ser. No. 714,128, filed Mar. 20, 1985; Ser. No. 737,702, filed May 28, 1985, now U.S. Pat. No. 4,623,573; and Ser. No. 738,450, filed May 28, 1985. The needlepoint canvas materials disclosed in these applications are basically flexible, non-distortable composite laminated sheet materials comprised of a primary layer of non-elastic, open-mesh woven needlepoint fabric which has bonded to one of its faces a relative thin, non-elastic secondary mesh-stabilizing layer of sheer (semi-transparent) fabric. The primary layer is preferably a mono-floating or mono-interlock needlepoint canvas material or "even weave" or "Congress" cloth material. The sheer fabric secondary layer of the composite laminated needlepoint canvas material is preferably a non-woven, semi-transparent, random-spun synthetic fiber material. The secondary layer is of such a sheerness that the holes or apertures of the canvas primary layer remain distinct to the needlepoint artisan and the secondary layer is relatively thin so that it is easily penetrated by the yarn-bearing stitchery needle.

It is an object of the present invention to provide a unique method for producing the flexible, non-distortable composite laminated needlework canvas materials described above.

Other objects and advantages of the invention will be apparent from the following detailed description of the method of the invention taken together with the accompanying drawing figures.

SUMMARY OF THE INVENTION

The present invention relates to an improved method of producing needlework canvas materials which are flexible, non-distortable composite laminated sheet materials comprised of a primary layer of non-elastic, open-mesh woven needlework fabric which has welded or bonded to one of its faces a relatively thin, non-elastic secondary mesh-stabilizing layer of sheer fabric. The primary layer is preferably a mono-floating or mono-interlock needlepoint canvas or "even weave" cloth material having a uniform pattern of apertures forming a symmetrical gridwork. Alternatively, the primary layer may be double thread needlepoint canvas material having principal apertures and smaller apertures. The threads of the open-mesh woven primary layer, if of cotton, linen or silk fibers, are impregnated and coated with a synthetic thermoplastic resin, mesh-stiffening material having adhesive properties. Where the threads of the woven primary layer are a mixture of synthetic resin and natural fibers little or no impregnating and coating resin may be required. Where the threads of such layer are comprised solely of synthetic resin fibers no impregnating and coating resin may be required.

The sheer fabric secondary layer of the composite laminated needlework canvas material is preferably a non-woven, semitransparent, random-spun synthetic fiber material. In accordance with the method of the invention the sheer secondary layer is welded or bonded to the open-mesh primary layer by the application of ultrasonic vibrations and pressure to the interfaced moving webs or plys of the primary layer of canvas material and the secondary layer of sheer fabric material. In effect, the ultrasonic vibratory energy, applied to the interfaced plys, results in creation of intermolecular mechanical stress which causes heating and melting of the thermoplastic or synthetic material of the woven primary layer and the synthetic random fiber material of the secondary layer. The thus melted thermoplastic material and synthetic fiber material co-mingle with welding or bonding of the primary layer to the secondary layer at the multiplicity of pressure points of contact of the threads of the primary layer with the fibers of the secondary layer, where stress is maximized. The high frequency vibratory energy, and its resultant site specific heat energy, is expended at the precise locations and areas of inter-ply contact and the heat energy is generated within the resin impregnated threads of the primary layer and within the synthetic fibers of the secondary layer thus minimizing degradation of the materials of such layers through excessive or misdirected heat.

PREFERRED EMBODIMENTS OF THE INVENTION

Figure 1:
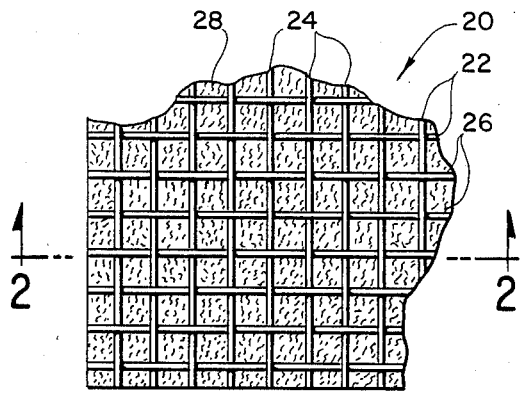
FIG. 1 is an enlarged top plan view of a composite laminated piece of the needlepoint canvas material produced by the method of the present invention with the sheer non-woven, random-spun synthetic fiber secondary layer affixed to the underside of the open-mesh woven canvas primary layer of the composite material.
Figure 2:
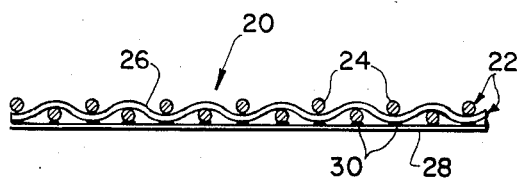
FIG. 2 is an enlarged sectional view of the needlepoint canvas material of FIG. 1 taken along line 2—2 of FIG. 1.

Referring initially to FIGS. 1 and 2 of the drawing, the composite laminated needlework canvas material 20 resulting from the method of this invention comprises a non-elastic, open-mesh woven needlework fabric primary layer 22 (comprised of warp threads 24 and weft threads 26) which has bonded or welded to one of its faces a relatively thin, non-elastic, mesh-stabilizing secondary layer of sheer fabric material 28. The primary layer to secondary layer bonding is accomplished by ultrasonic energy heating and melting of the thermoplastic material of the woven primary layer and of the synthetic resin random fibers of the secondary layer solely at the points of contact of the primary layer with the secondary layer. The thermoplastic material applied to the natural fiber threads or the thermoplastic fibers of mixed fiber threads of the primary layer and the synthetic fibers of the secondary layer, at the interlayer contact points, are fused by ultrasonic heating and the application of pressure to the two interfaced layers. The bonding of the layers occurs at a multiplicity of small interlayer contact points 30 and the apertures of the open-mesh primary layer are maintained functionally free of any melted and co-mingled thermoplastic material and/or synthetic fiber material.

Figure 3:
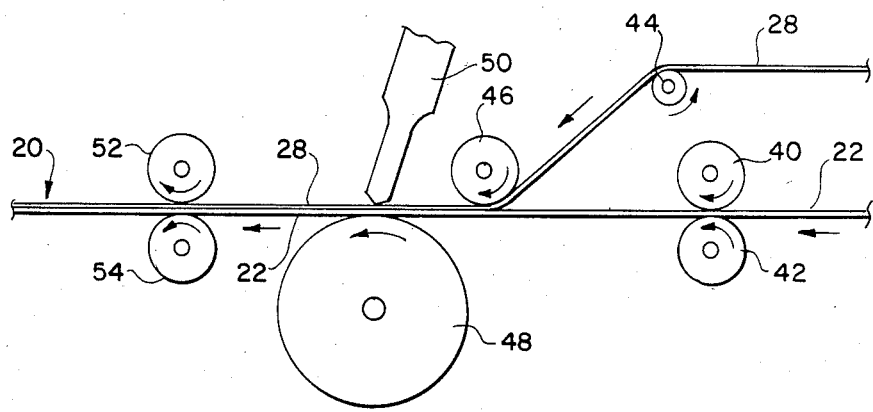
FIG. 3 is a somewhat diagramatic showing of the method of applying the sheer secondary layer to the open-mesh primary layer to form the composite laminated needlepoint canvas material of the invention.

In FIG. 3 there is illustrated, in somewhat diagrammatic fashion, the method of the present invention for welding or bonding the sheer secondary layer 28 to the open-mesh primary layer 22 to form the desired composite laminated needlework canvas material 20. In accordance with the methodology illustrated in FIG. 3 a web of non-elastic, open-mesh woven needlework fabric 22 (cotton, linen or silk fibers, threads impregnated and coated with a thermoplastic resin, all synthetic fiber threads or mixed synthetic resin and natural fiber threads) is fed as a primary laminate layer between web transport or guide rolls 40 and 42. Such rolls may be heated to provide pre-heat to fabric 22. A web of relatively thin, non-elastic, non-woven, random-spun synthetic fiber textile material 28 passes over guide roll 44 and is interfaced (as a secondary laminate layer) with the web of open-mesh woven fabric 22. The interfaced webs of resin impregnated or all synthetic or mixed synthetic fiber woven fabric 22 and random-spun synthetic fiber textile material 28 are passed between a rotary anvil member 48 and an ultrasonic vibration transmitting member or horn 50 of an ultrasonic generator system at a throughput rate of about 5 feet per minute (fpm) to about 20 fpm. The ultrasonic system (not shown) comprises an electrical power supply (converts 50 or 60 Hz electrical power to 20,000 Hz or more electrical energy), an electro-mechanical converter or transducer (high frequency electrical energy is converted to inaudible mechanical vibrations), a vibration amplifier or booster and the ultrasonic vibration transmitting member or horn 50. The ultrasonic horn applies pressure to the moving interfaced webs of woven fabric 22 and synthetic material 28 and through its transmitted ultrasonic mechanical vibrations creates intermolecular mechanical stress within the resin impregnated threads, all synthetic threads or mixed synthetic fibers of the threads of the woven fabric material of the primary layer and within the synthetic fibers of the non-woven secondary layer during their period of pressure contact between the horn 50 and the supporting rotary anvil 48. The intermolecular mechanical stress causes instantaneous heating, melting and reforming of the resin of the woven fabric material and the synthetic fibers of the non-woven fabric material within the fibers themselves in the precise areas of the pressure contact (stress points) between the primary and secondary layers (thread cross-over contact points 30 in FIG. 2). Thus, the highly focused or directed heating accomplished by ultrasonic horn 50 avoids degradation of the resin impregnated threads or synthetic fibers of the threads of the woven material of the primary layer and the synthetic fibers of the secondary layer through excessive heat. The mesh apertures of the woven layer of material are maintained functionally free of the resin of the woven primary layer and of synthetic fiber material of the secondary layer. Dwell time and throughput speed is controlled to optimize welding or bonding of the layers.

Although the methodology of the invention, as illustrated in FIG. 3, shows application of horn 50 to the synthetic material 28, it is to be understood that the positions of the moving webs may be reversed so that horn 50 is applied to the primary layer web 22 and the secondary web 28 is in direct moving contact with rotary anvil 48.

Following the application of ultrasonic energy and pressure to the interfaced layers 22 and 28 they are advanced beyond the area of ultrasonic heating and are cooled to fuse the melted resin of the woven fabric material of the primary layer with the melted synthetic fibers of the non-woven material of the secondary layer to form a composite laminated needlework canvas material 20. The laminated material, during its cooling phase, may be advanced through one or more sets of pressure rolls 52 and 54 which may be cooled to acelerate the fusing of the laminate layers. The resultant composite material is non-distortable and dimensionally stable because the warp and weft threads of the primary open-mesh canvas layer are kept in proper alignment by their welded or bonded relationship to the sheer non-elastic, mesh-stabilizing secondary layer of fabric material. Further, because of the welding or bonding of the warp and weft threads of the primary open-mesh canvas layer to the mesh-stabilizing secondary layer, the composite canvas material produced by the process of the invention does not ravel at its edges before, during or after the application of needlework stitchery thereto.

EXAMPLE

A broad selection of composite laminated, non-distortable needlework canvas materials have been fabricated in accordance with the methodology of the present invention. For example, a most suitable composite canvas material for needlepoint stitchery is prepared utilizing commercially available non-elastic, cotton thread, open-mesh, mono-floating weave, 12 gauge (unsized) needlepoint canvas material weighing 4.0 ounces per square yard and having an average thickness of 0.03 inch. The threads of such woven material were impregnated and coated with heated thermoplastic polyvinyl acetate emulsion polymer and then cooled to set and stiffen the material. The polymer impregnated and coated open-mesh fabric material weighing 4.8 ounces per square yard) was interfaced as a moving primary layer with a moving secondary layer of commercially available non-elastic, non-woven, semi-transparent, random-spun polyester synthetic fiber material weighing 0.5 ounce per square yard. The moving interfaced woven open-mesh primary layer and random-spun polyester fiber non-woven secondary layer were passed between a rotary anvil and an ultrasonic vibration transmitting horn for welding or bonding of the secondary layer to the primary layer at the precise surface points where the warp and weft threads of the interface surface of the primary layer contacted (under pressure) the interface surface of the secondary layer. The outer face of the woven primary layer passed over the anvil and the ultrasonic bar horn ($\frac{1}{2}''\times7$ and $\frac{1}{4}''$) applied 30 psi of pressure to the secondary layer against the primary layer and anvil. The bar horn was operated at 20 KHz. The horn to anvil pressure and horn vibration amplitude applied to the interfaced layers were such that welding or bonding of the synthetic fibers of the secondary layer to the threads of the primary layer occurred solely at the contact points of the thermoplastic impregnated and coated warp and weft threads of the primary layer with the secondary layer random-spun polyester fibers. A materials throughput speed of 5 ft./min was utilized to optimize the secondary layer to primary layer welding. The resulting composite laminate material was cooled by passing same through a set of cold pressure rolls to reset the co-mingled polymers of the layers at the weld points with such composite material having an average thickness of 0.033 inch and having a weight of 5.3 ounces per square yard.

The unique composite needlepoint canvas material of the above example is non-distortable when needlework stitchery is applied and the material exhibits no edge raveling when cut into a variety of rectangular or irregular shapes. Further, the material is easily machine cut into narrow ravel-free strips.

The non-elastic, non-woven, semi-transparent, random-spun synthetic fiber material comprising the secondary mesh-stabilizing layer of the composite laminated needlework material produced by the methodology of this invention may be formed of melt blown polymeric fibers, including polyester, nylon, polyethylene or polypropylene fibers, having a diameter of 1 to 50 microns (preferably less than 10 microns). The thermoplastic fibers of the secondary layer of the laminated material should be molecularly compatible with the synthetic thermoplastic resin used to impregnate and coat the threads of the open-mesh natural fiber woven primary layer or with the all synthetic thermoplastic fibers or the mixed synthetic fiber threads of the woven primary layer material. Preferably the melting point temperature of the thermoplastic impregnating resin (primary layer) is lower than the melting point temperature of the polymeric fibers of the secondary layer. Another suitable mixed-fiber thread woven primary layer material may be a woven polyester canvas material (polyester and cotton fiber threads), particularly material woven of threads having 65% polyester fibers and 35% cotton fibers. Through the ultrasonic welding or bonding methodology of the present invention the pressure and vibrations are applied only to the laminate areas to be bonded (contact points of warp and weft threads of the primary layer with the synthetic fibers of the secondary layer) with the result of directed creation of intermolecular stress and highly focused heating. Heat energy is not conducted through the fibers to be bonded. Rather, heat energy is generated within the fibers themselves in the pressure contact areas thus minimizing degradation of materials through excessive heat. Because of the highly focused heating of the materials forming the composite laminated needlework material at their precise interlayer pressure contact areas, the apertures of the woven primary layer are maintained substantially free of comingled bonding thermoplastic material.

The optimum practice of the methodology of the invention is dependent upon appropriate adjustment of the variables of: ultrasonic horn vibration frequency (20 kH$_3$ and above) and amplitude (0.002–0.006); pressure applied to the laminate webs to be bonded (20–40 psi); time of application of the ultrasonic vibrations to the laminate webs (expressed as throughput rate); and melting point temperatures of the polymeric materials of the laminates to be heated. As previously indicated, it is preferred to use a materials throughput rate of about 5 fpm to about 20 fpm. Highest throughput rates are utilized when the threads of the woven primary layer are impregnated and coated with a lower melting point temperature material.

In the specification and drawing figures there has been set forth a preferred embodiment of the invention and although specific terms have been employed, they are used in a generic and descriptive sense only and not for purposes of limitation, the scope of the invention being defined in the following claims.

What is claimed is:

1. A method of producing a composite laminated, non-distortable needlework canvas material which comprises:
    (a) interfacing a moving web of non-elastic, open-mesh woven fabric material as a primary layer with a moving web of relatively thin sheer non-elastic, random-spun synthetic fiber non-woven textile material as a secondary layer, said primary layer being woven of threads formed of fibers selected from the group consisting of: (i) natural fibers impregnated and coated with a synthetic resin, (ii) natural fibers in admixture with synthetic resin fibers, and (iii) synthetic resin fibers;
    (b) advancing the interfaced primary layer of woven fabric material and the secondary layer of random-spun synthetic fiber non-woven textile material together between one or more ultrasonic vibration transmitting members in pressure contact with one of said layers and a rotary anvil member in supporting contact with the other of said layers in an ultrasonic heating zone;
    (c) energizing the ultrasonic vibration transmitting members to create intermolecular mechanical stress within the resin impregnated natural fibers or the synthetic resin fibers of the woven fabric material of the primary layer and within the random-spun synthetic fibers of the non-woven textile material of the secondary layer during their period of pressure contact within said heating zone between the ultrasonic vibration transmitting members and the rotary anvil member thereby to cause heating and melting of the resin impregnating the natural fibers or the synthetic resin fibers of said woven fabric material and of the random-spun synthetic fibers of said non-woven material solely in the areas of the pressure contact between said layers; and
    (d) advancing the interfaced and heated primary layer of woven fabric material and secondary layer of non-woven synthetic fiber material beyond said heating zone and cooling said interfaced layers to fuse the melted resin impregnating the natural fibers or melted synthetic resin fibers of said woven fabric material with the melted random-spun synthetic fibers of said non-woven material at the areas of contact between said layers to form said composite laminated canvas material, the mesh apertures of the woven fabric material remaining functionally free of the impregnating resin and synthetic resin fibers of said primary layer and of the random-spun synthetic fibers of said secondary layer.

2. The method of producing a composite laminated, non-distortable needlework canvas material as claimed in claim 1 wherein the layer of random-spun synthetic fiber material is formed of melt blown polymeric fibers selected from the group consisting of polyester, nylon, polyethylene and polypropylene fibers.

3. The method of producing a composite laminated non-distortable needlework canvas material as claimed in claim 1 wherein the areas of pressure contact between the primary and secondary layers comprise primarily the outermost surface points of the wrap and weft threads on the interface surface of the primary layer in contact with the random-spun synthetic fibers of the secondary layer.

4. The method of producing a composite laminated non-distortable needlework canvas material as claimed in claim 1 wherein the pressure applied by the ultrasonic vibration transmitting members to the rotary anvil through the interfaced primary and secondary layers of the composite material is from about 20 psi to about 40 psi.

5. The method of producing a composite laminated non-distortable needlework canvas material as claimed in claim 1 wherein the throughput rate of said interfaced primary layer and secondary layer through the ultrasonic heating zone is from about 5 fpm to about 20 fpm.

6. The method of producing a composite laminated non-distortable needlework canvas material as claimed in claim 1 wherein the threads of the primary layer of woven fabric material are formed of polyester synthetic resin fibers.

7. The method of producing a composite laminated, non-distortable needlework canvas material as claimed in claim 1 wherein the threads of the primary layer of woven fabric material constitute a mixture of about 65% of polyester synthetic resin fibers and about 35% of cotton fibers.

8. A method of producing a composite laminated, non-distortable needlework canvas material which comprises:
    (a) interfacing a moving web of non-elastic, open-mesh woven fabric material as a primary layer with a moving web of relatively thin sheer non-elastic, random-spun synthetic fiber non-woven textile material as a secondary layer, said primary layer being woven of threads formed of natural fibers impregnated and coated with polyvinyl acetate synthetic resin;
    (b) advancing the interfaced primary layer of woven fabric material and the secondary layer of random-spun synthetic fiber non-woven textile material together between one or more ultrasonic vibration transmitting members in pressure contact with one of said layers and a rotary anvil member in supporting contact with the other of said layers in an ultrasonic heating zone;
    (c) energizing the ultrasonic vibration transmitting members to create intermolecular mechanical stress within the resin impregnated natural fibers of the woven fabric material of the primary layer and within the random-spun synthetic fibers of the non-woven textile material of the secondary layer during their period of pressure contact within said heating zone between the ultrasonic vibration transmitting members and the rotary anvil member thereby to cause heating and melting of the resin impregnating the natural fibers of said woven fabric material and of the random-spun synthetic fibers of said non-woven material solely in the areas of the pressure contact between said layers; and (d) advancing the interfaced and heated primary layer of woven fabric material and secondary layer of non-woven synthetic fiber material beyond said heating zone and cooling said interfaced layers to fuse the melted resin impregnating the natural fibers of said woven fabric material with the melted random-spun synthetic fibers of said non-woven material at the areas of contact between said layers to form said composite laminated canvas material, the mesh apertures of the woven fabric material remaining functionally free of the impregnating resin of said primary layer and of the random-spun synthetic fibers of said secondary layer.

9. The method of producing a composite laminated, non-distortable needlework canvas material as claimed in claim 8 wherein the melting point temperature of the resin impregnating and coating the fibers of the open-mesh woven primary layer is lower than the melting point temperature of the random-spun synthetic fiber material of the secondary layer.

* * * * *